E. A. DIETERICH.
AUXILIARY ACTUATING DEVICE FOR THE BRAKE MECHANISM OF AN AUTOMOBILE.
APPLICATION FILED DEC. 31, 1913.
1,131,484.
Patented Mar. 9, 1915.
5 SHEETS—SHEET 1.
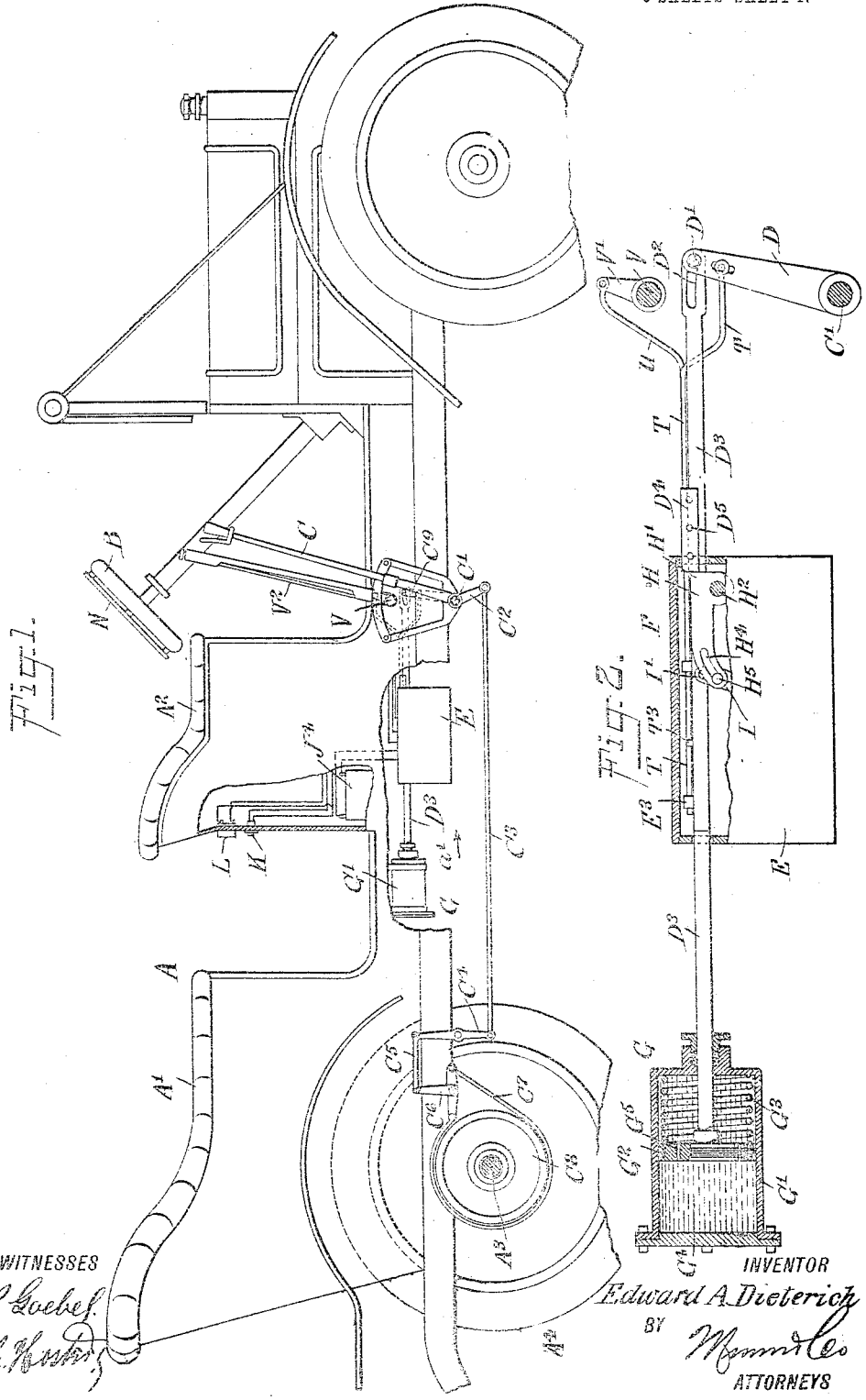
WITNESSES
INVENTOR
Edward A. Dieterich
BY
ATTORNEYS

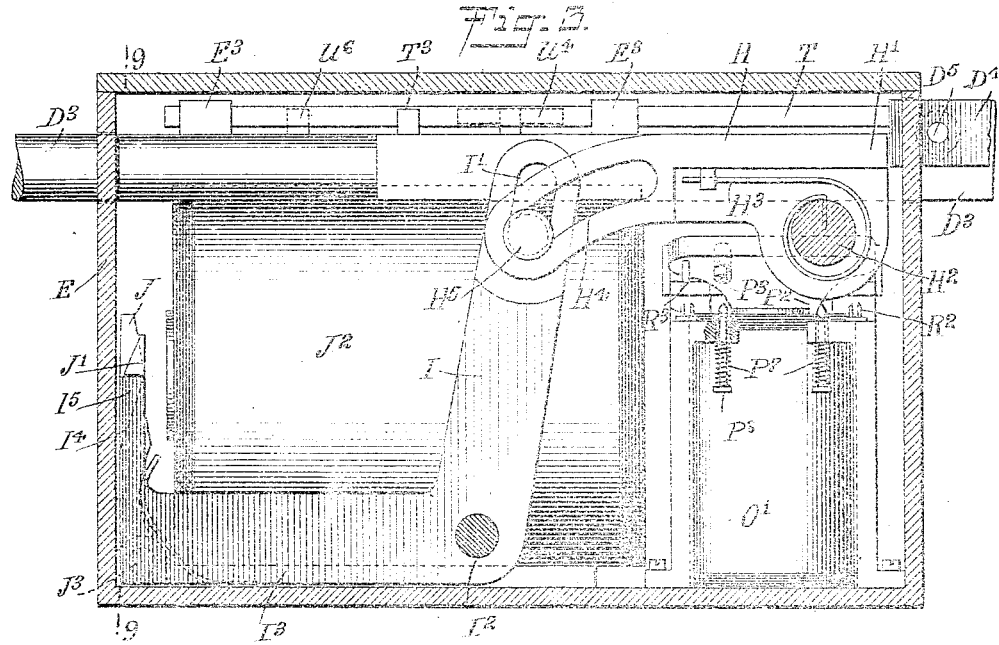
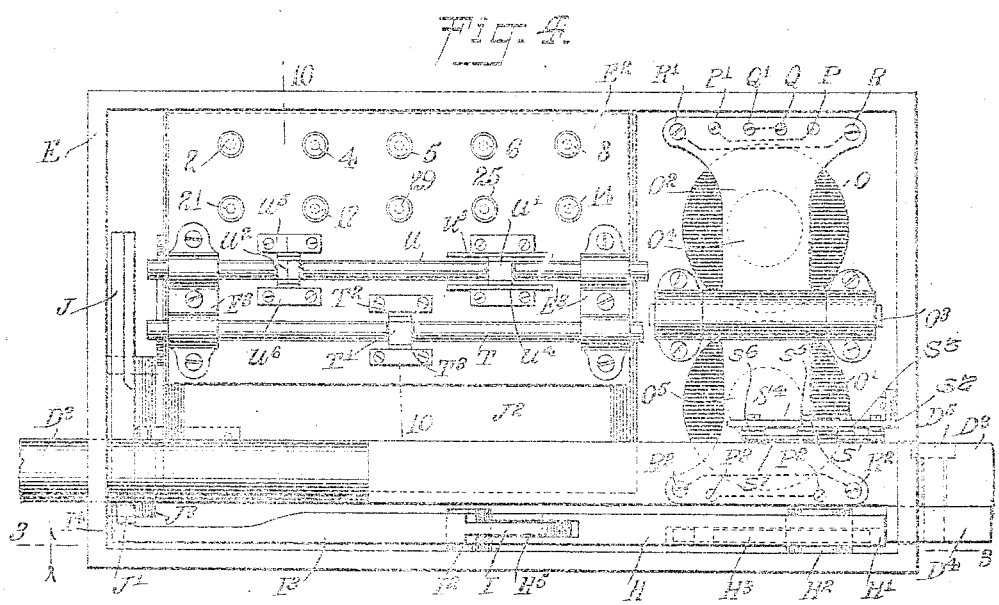

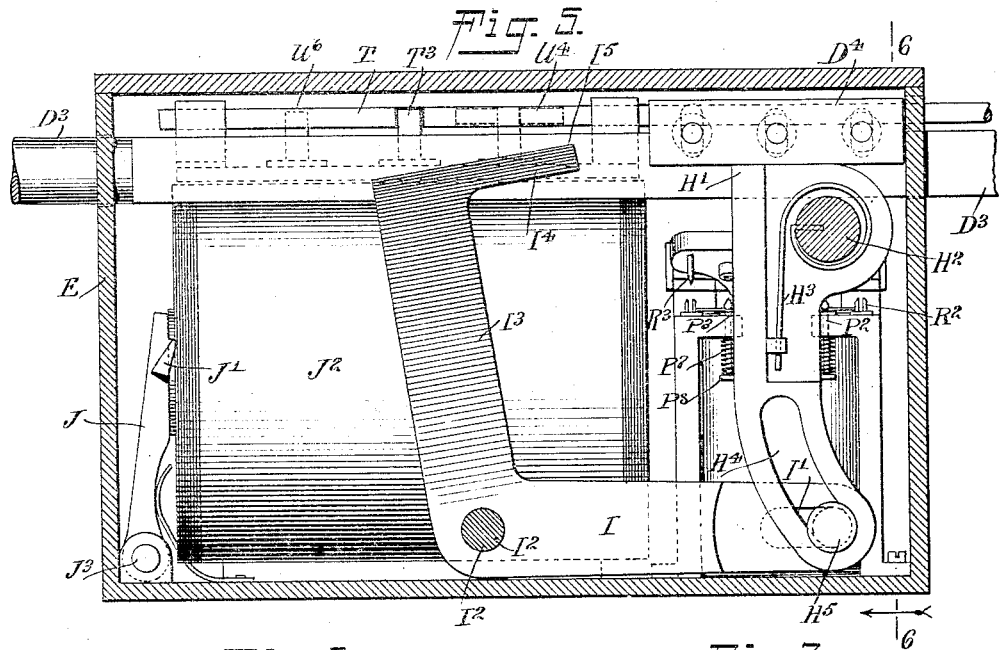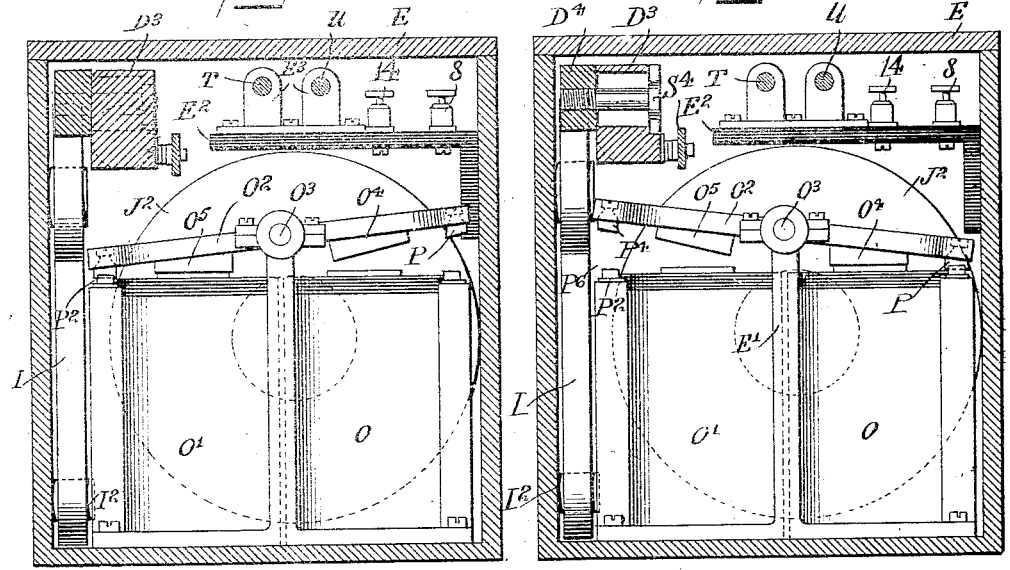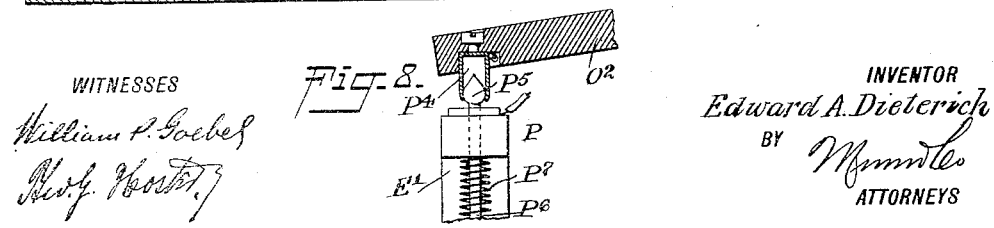

E. A. DIETERICH.
AUXILIARY ACTUATING DEVICE FOR THE BRAKE MECHANISM OF AN AUTOMOBILE.
APPLICATION FILED DEC. 31, 1913.
1,131,484.
Patented Mar. 9, 1915.
5 SHEETS—SHEET 4.
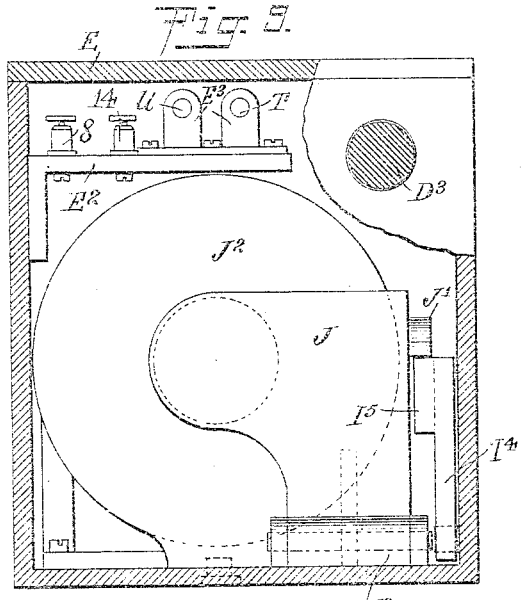
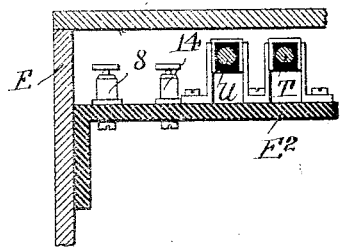
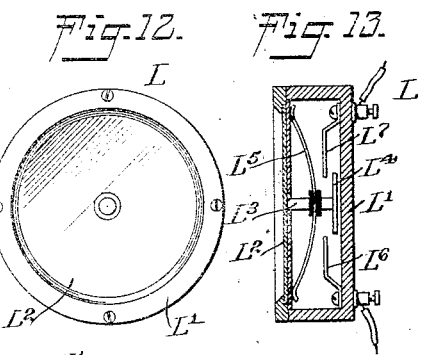
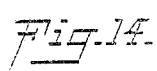
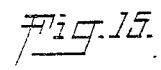
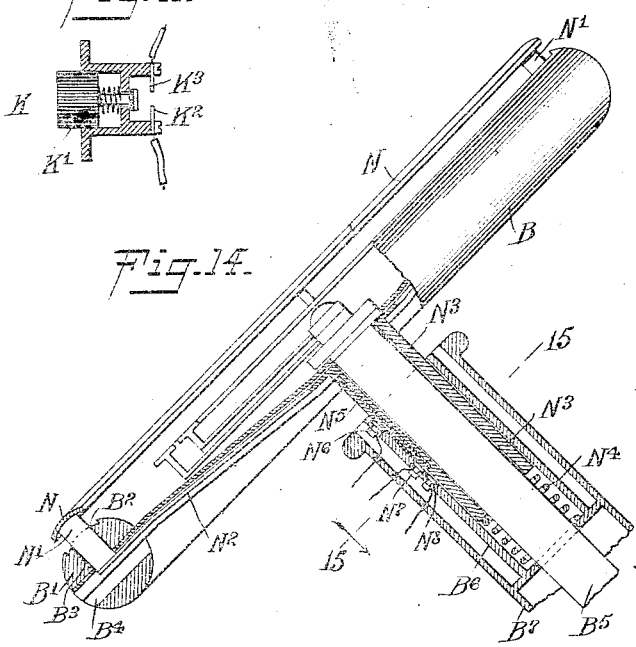
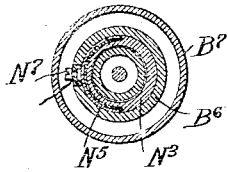
WITNESSES
William P. Goebel
Geo. J. Foster
INVENTOR
Edward A. Dieterich
BY
Munn & Co.
ATTORNEYS E. A. DIETERICH.
AUXILIARY ACTUATING DEVICE FOR THE BRAKE MECHANISM OF AN AUTOMOBILE.
APPLICATION FILED DEC. 31, 1913.
1,131,484.
Patented Mar. 9, 1915.
5 SHEETS—SHEET 5.
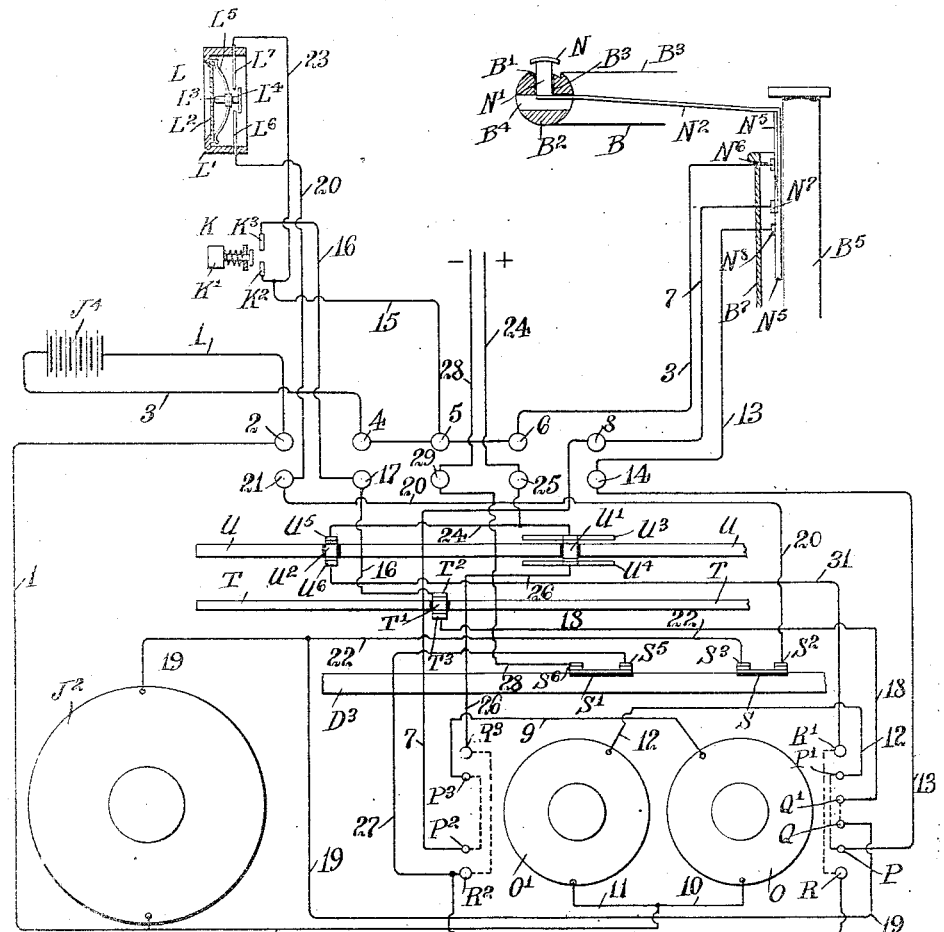
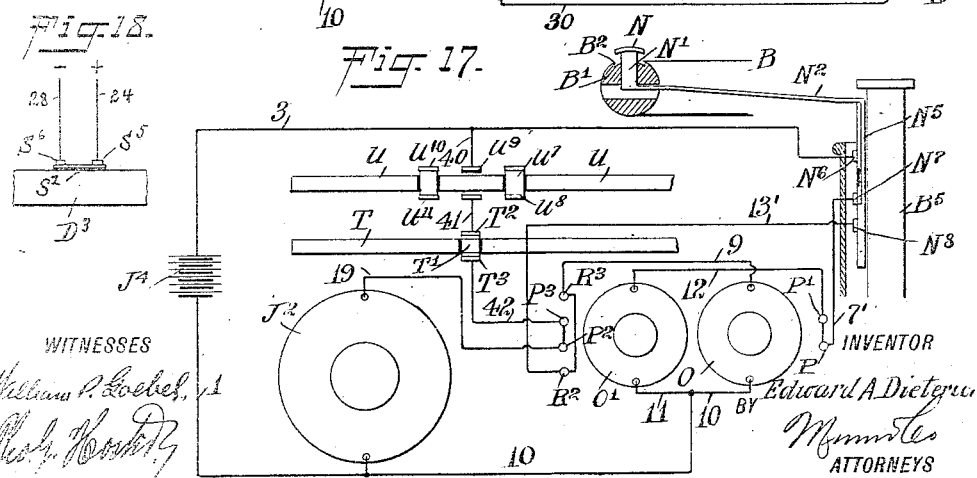
WITNESSES
INVENTOR
Edward A. Dieterich
BY
ATTORNEYS

UNITED STATES PATENT OFFICE.

EDWARD A. DIETERICH, OF NEW YORK, N. Y.

AUXILIARY ACTUATING DEVICE FOR THE BRAKE MECHANISM OF AN AUTOMOBILE.

1,131,484.

Specification of Letters Patent.

Patented Mar. 9, 1915.

Application filed December 31, 1913. Serial No. 809,754.

*To all whom it may concern:*

Be it known that I, EDWARD A. DIETERICH, a citizen of the United States, and a resident of the city of New York, borough of the Bronx, in the county of Bronx and State of New York, have invented a new and Improved Auxiliary Actuating Device for the Brake Mechanism of an Automobile, of which the following is a full, clear, and exact description.

The invention relates to auxiliary actuating devices for the brake mechanism of an automobile, such for instance as shown and described in the application for Letters Patent of the United States, Serial No. 801,957, filed by me on November 19, 1913.

The object of the present invention is to provide a new and improved auxiliary actuating device of the electrical type for controlling the brake mechanism of an automobile by an occupant of a rear seat in case the chauffeur is absent or the chauffeur fails or is incapacitated to apply the brakes to stop the motor on manipulating the auxiliary actuating device, to prevent the occupant from applying the brakes as long as the chauffeur is properly attending to his duty, and to allow the occupant to apply the brakes in case of an emergency and wholly independent of the chauffeur.

In order to accomplish the desired result use is made of a manually-controlled electrical mechanism connected with the regular brake mechanism of the automobile and having electrically-controlled operating means extending within reach of the occupant of the rear seat of the automobile.

A practical embodiment of the invention is represented in the accompanying drawings forming a part of this specification, in which similar characters of reference indicate corresponding parts in all the views.

Figure 1 is a side elevation of an automobile provided with the auxiliary brake mechanism, part of the automobile being broken out and parts being shown in section; Fig. 2 is an enlarged sectional side elevation of part of the auxiliary actuating device; Fig. 3 in a sectional side elevation of the locking and releasing device on the line 3—3 of Fig. 4; Fig. 4 is a plan view of the same with the cover of the casing removed; Fig. 5 is a sectional side elevation of the same with the parts in released position; Fig. 6 is a cross section of the same on the line 6—6 of Fig. 5; Fig. 7 is a similar view of the same with the parts in a different position; Fig. 8 is an enlarged sectional elevation of one of the sliding contacts; Fig. 9 is a cross section of the locking and releasing device, the section being on the line 9—9 of Fig. 3; Fig. 10 is an enlarged cross section of part of the stem on the line 10—10 of Fig. 4; Fig. 11 is an enlarged sectional side elevation of the push button to be actuated by a passenger in a rear seat; Fig. 12 is a face view of the emergency switch to be actuated in an emergency by a passenger on the rear seat; Fig. 13 is a sectional side elevation of the same; Fig. 14 is an enlarged sectional side elevation of the steering wheel and the controlling device mounted thereon; Fig. 15 is a sectional plan view of the same on the line 15—15 of Fig. 14; Fig. 16 is a diagrammatic view of the electrical connections; Fig. 17 is a diagrammatic view of the electrical connections of a modified form of the auxiliary actuating device; Fig. 18 is a similar view of the electric connection of the ignition circuit with the release rod.

The automobile A illustrated in Fig. 1 is provided with rear seats A' for one or more passengers, and front seats $A^2$, one of which is occupied by the chauffeur controlling the steering wheel B of the steering device as well as the usual other controlling devices of an automobile including the emergency brake lever C held on a shaft C' provided with an arm $C^2$ connected by a link $C^3$ with a lever $C^4$ pivotally connected by a link $C^5$ with a lever $C^6$ connected with the ends of the brake band $C^7$ operating in conjunction with the peripheral face of the brake wheel $C^8$ on the shaft $A^3$ of the rear or drive wheel $A^4$ of the automobile. This brake mechanism is of the usual construction and the brake band $C^7$ is also controlled by the usual foot pedal under the control of the foot of the chauffeur seated on the seat $A^2$. It is understood that when the emergency brake lever C is moved rearwardly the rod $C^3$ is moved forwardly in the direction of the arrow $a'$ to cause the brake band $C^7$ to move in firm braking contact with the brake wheel $C^8$ to brake the automobile and thus eventually bring the same to a standstill. The auxiliary actuating device which forms my invention is shown connected with an arm D extending upwardly from the shaft C' (see Figs. 1 and 2) although the said auxiliary actuating device may be connected with other parts of the usual or regular brake mechanism to accomplish the same result as hereinafter more fully explained. The upper end of the arm D is provided with a transversely-extending pin D' engaging a slot D² formed in the forward end of a rod D³ extending through a casing E attached to the framework or body of the automobile A. The casing E contains a locking and releasing device F for normally locking the rod D³ in forward position, and when the said device F is actuated the rod D³ is released and is moved rearwardly by a spring device G connected with the rear end of the rod D³ so that a swinging motion is given to the arm D whereby the shaft C' is turned and the link C³ is moved forwardly to apply the brake with a view to bring the automobile to a standstill. The spring device G consists of a cylinder G' attached to the under side of the bottom of the body of the automobile A and in the said cylinder is mounted to reciprocate a piston G² attached to the rear end of the rod D³. A spring G³ is arranged in the front end of the cylinder G' and presses against the piston G² so as to move the same in a rearward direction whenever the rod D³ is released, as hereinafter more fully explained. In order to prevent the sudden rearward movement of the piston G² on the rod D³ by the action of the spring G³ use is made of a retarding device consisting of a liquid G⁴ filling the cylinder G' and adapted to flow from one side of the piston G² to the other side thereof by way of an aperture G⁵ formed in the said piston, as plainly indicated in Fig. 2. As the flow of the liquid through the aperture G⁵ is comparatively slow, it is evident that the piston G² moves slowly in the cylinder whenever the rod D³ is released, thus preventing a sudden, jerky application of the brake.

In order to hold the rod D³ in locked forward position, the following arrangement is made: On the rod D³ at the front end of the casing E is secured a block or shoulder D⁴ by the use of bolts D⁵ which pass through vertically-extending slots formed in the block D⁴ to allow vertical adjustment of the said block on the rod D³. The rear end of the block D⁴ extends into the casing E (see Figs. 2, 3 and 4) and abuts against the heel H' of an arm H mounted to swing on a stud H² attached to the casing E. A spring H³ is secured at one end to the stud H² and presses at its other end on the arm H so as to normally hold the arm H in locking position relative to the block D⁴, as plainly indicated in Figs. 2, 3 and 4. The free end of the arm H is provided with a curved slot H⁴ in which is mounted to travel a pivot H⁵ extending through a slot I' formed in the upper end of a lever I fulcrumed on a stud I² attached to the casing E. The lever I has a rearward angular extension I³ terminating in an upwardly-extending arm I⁴ provided with a transversely-extending lug I⁵ on which rests a lug J' of a spring-pressed armature lever J of a powerful electro-magnet J² held in the casing E. The armature lever J is fulcrumed at J³ in the casing E and the said armature lever J is normally in locking position relative to the lug I⁵, as plainly shown in Figs. 3 and 4, to hold the lever I in locked position. When the lever I is in this position the pivot H⁵ holds the arm H against downward swinging movement and consequently the rod D³ is held locked in forward position. When the electro-magnet J² is energized, as hereinafter more fully explained, then the armature lever J is attracted and hence swings forward and in doing so the lug J' moves out of engagement with the lug I⁵ thus releasing the lever I. When this takes place the rearward pull on the rod D³ exerted by the spring G³ causes the block D⁴ to swing the arm H downward into the position shown in Fig. 5, thus releasing the rod D³ and allowing the same to move rearward by the action of the spring G³. This rearward movement of the rod D³ causes a rearward swinging of the arm D so that the shaft C' is turned and the brake is applied as previously mentioned. It is understood that when the rod D³ is in locked position, as shown in Figs. 1, 2, 3 and 4, then the chauffeur can manipulate the emergency lever C in the usual manner without affecting the locked rod D³ as the pin D' of the arm D is free to travel in the slot D², but when the rod D³ is released as above explained and moves rearwardly then a rearward swinging motion is given to the arm D for turning the shaft C' to apply the brakes the same as if the chauffeur had moved the lever C rearwardly. The energizing of the electro-magnet J² is controlled by a passenger in a rear seat A' by the use of a switch K in the form of a push button, or by an emergency switch L, both switches K and L being arranged in the back of the forward seat A² so as to be within convenient reach of a passenger in the rear seat A', as will be readily understood by reference to Fig. 1. Closing of the switch K is however ineffective relative to the energizing of the electro-magnet J² as long as the chauffeur is on the seat and attends properly to his duties and for this purpose use is made of a shut-out device under the control of the chauffeur. This device is arranged as follows: A rim N is arranged above the rim B' of the steering wheel B and is adapted to be seated in an annular recess B² (see Figs. 14, 15, 16 and 17) formed in the top of the rim B'. The controlling rim N is provided with lugs N' mounted to slide in openings B³ formed in the rim B', and the lower ends of the lugs N' are attached to the outer ends of the spokes $N^2$ located within the hollow spokes $B^4$ of the steering wheel B, and the said spokes $N^2$ radiate from a hub or sleeve $N^3$ mounted to slide on the shaft $B^5$ of the steering wheel B. The hub $N^2$ fits into a chamber $B^6$ formed in the upper end of the staff $B^7$ of the steering wheel, and the lower end of the said hub $N^3$ is pressed on by a spring $N^4$ seated in the bottom of the chamber $B^6$, as plainly shown in Fig. 14. The free ends of the spokes $N^2$ project into apertures $B^4$ formed in the rim B' and by the arrangement described the chauffeur can readily press the rim N downwardly into the seat $B^2$ when having hold of the rim B' of the steering wheel B. As soon as the chauffeur releases the rim B' and consequently the rim N then the spring $N^4$ forces the rim N upwardly into the position shown in Figs. 14, 16 and 17.

The hub $N^3$ is provided with an insulated contact plate $N^5$ at all times in contact with an insulated contact $N^6$ held in the wall of the chamber $B^6$, and the said plate $N^5$ is in engagement with an insulated contact $N^7$ at the time the rim N is in an upward position, and the said contact plate $N^5$ is adapted to move into engagement with an insulated contact $N^8$ at the time the rim N is pressed downward into the seat $B^2$. The contacts $N^7$, $N^8$ are held in the wall of the chamber $B^6$, the same as the contact $N^6$, and the said contacts $N^6$, $N^7$ and $N^8$ are electrically connected with electro-magnets O and O' mounted in the casing E, the connection being arranged as follows: An armature lever $O^2$ is fulcrumed at its middle at $O^3$ on a frame E' mounted in the casing E, and the said armature lever is provided with armatures $O^4$, $O^5$ in juxtaposition to the cores of the electro-magnets O, O', the arrangement being such that when the armature lever $O^2$ is in the position shown in Fig. 6 the armature $O^5$ is attracted by the energized electro-magnet O' while the armature $O^4$ is held out of engagement with the electro-magnet O. When the electro-magnet O' is deënergized and the electro-magnet O is energized, a swinging motion is given to the lever $O^2$ so that the armature $O^4$ is in engagement with the core of the electro-magnet O while the armature $O^5$ is out of engagement with the core of the electro-magnet O'. The armature lever $O^2$ is provided at the end next to the electro-magnet O with two movable contacts P, P', two ordinary knife switches Q, Q' for the circuit of the switch K, and two ordinary knife switches R, R' for the ignition circuit, as hereinafter more fully explained. The other end of the armature lever $O^2$ is provided with two movable contacts $P^2$, $P^3$ similar to the contacts P, P' and two ordinary knife switches $R^2$, $R^3$ for the ignition circuit. Each of the movable contacts P, P', $P^2$ and $P^3$ consists of a cup $P^4$ attached to the armature lever $O^2$ and engaging a head $P^5$ held on the upper end of a rod $P^6$ mounted to slide in the frame E'. A spring $P^7$ is coiled on the rod $P^6$ and rests with its upper end on the frame E' and presses with its lower end on a collar $P^8$ attached to the lower end of the rod $P^6$. The mouth of the cup $P^4$ is somewhat contracted to firmly engage the spherical head $P^5$, and when the armature lever $O^2$ rocks, the upwardly-moving end thereof causes the cup $P^4$ to carry the head $P^5$ and the rod $P^6$ along until the upwardly-moving end of the armature lever nears its uppermost position and at this time the spring $P^7$ is sufficiently compressed to overcome the friction between the cup $P^4$ and the head $P^5$ to disengage the cup $P^4$ from the head $P^5$ thus breaking the circuit. It will be noticed that by this arrangement the movable contacts P, P' are broken at the time the right-hand end of the armature lever $O^2$ nears its uppermost position, and likewise the contacts $P^2$, $P^3$ are broken at the time the left-hand end of the armature lever $O^2$ nears its uppermost position. By this arrangement the circuits are not broken until the armature lever $O^2$ has nearly completed its stroke in one direction or the other. It will be noticed that by breaking the contacts P, P' and $P^2$, $P^3$ as described the battery J' is not unnecessarily run down. The switch K is provided with the usual spring-pressed contact K' adapted to be moved into engagement with contacts $K^2$, $K^3$ whenever the member K' is pressed by a passenger in the rear seat. The emergency switch L is provided with a casing L' (see Figs. 12 and 13) having a glass front $L^2$ against the inner face of which abuts the stem $L^3$ of a contact $L^4$, but the said stem $L^3$ is pressed on by a spring $L^5$ to normally hold the stem $L^3$ against the glass front $L^2$ and to hold the contact $L^4$ normally out of engagement with the contacts $L^6$, $L^7$ arranged in the casing L'. Now in case of an emergency a passenger in the rear seat A' breaks the glass front $L^2$ thus releasing the stem $L^3$ and allowing the spring $L^5$ to move the contact $L^4$ into engagement with the contacts $L^6$, $L^7$.

On the rod $D^3$ within the casing E are secured insulated contact plates S and S', of which the plate S is normally in engagement with contacts $S^2$, $S^3$ held on the insulated arm $S^4$ attached to the inside of the casing E (see Fig. 4). The other plate S' is in engagement with contacts $S^5$, $S^6$ held on the arm $S^4$ above mentioned. It is understood that the normal position of the rod $D^3$ above referred to is the one in which the said rod $D^3$ is held locked in a forward position by the arm H, as previously explained.

Within the casing E is arranged a bracket $E^2$, of hard rubber or other insulating material, and on the said bracket are secured bearings E³ in which are mounted to slide rods T and U, of which the rod T is pivotally connected with the arm D, as plainly indicated in Fig. 2. The rod U is pivotally connected with an arm V' held on the shaft V of the lever V² of the change speed gear mechanism. The rod T is provided with an insulated contact T' normally in engagement with contacts T², T³ mounted on the bracket E². The rod U is provided inside of the casing E with insulated contacts U', U² of which the contact U' is at all times in contact with contacts U³, U⁴ held insulated on the bracket E². The contact U² is normally in contact with contacts U⁵, U⁶ held on the bracket E². It will be noticed that when the rod T is shifted its contact T' moves out of engagement with the contacts T², T³, and when the rod U is shifted the contact U' is in engagement with the contacts U³, U⁴ while the contact U² moves out of engagement with the contacts U⁵ and U⁶.

The electric circuit of the electro-magnet J² contains a battery or other source of electrical energy J⁴ preferably placed under the front seat A², as indicated in Fig. 1. One electrode of the battery J⁴ is connected with a wire 1 connected by way of a binding post 2 with the electro-magnet J² (see Fig. 16). The other electrode of the battery J⁴ is connected by a wire 3 and binding posts 4, 5 and 6 with the contact N⁶ on the steering device. The contact N⁷ is connected by a wire 7 and a binding post 8 with the movable contact P² to connect by way of the armature lever with the movable contact P³ connected by wire 9 with one end of the electro-magnet O, the other end of which is connected by a wire 11 with the electro-magnet J² at the wire 1. The wire 10 is also connected by a wire 11 with one end of the electro-magnet O', which has its other end connected by a wire 12 with the movable contact P' connected with the movable contact P at the time the armature lever O² is in the position shown in Fig. 7, and the movable contact P is connected by a wire 13 and a binding post 14 with the contact N⁸.

The electric circuit for the switch K is arranged as follows: The binding post 5 previously mentioned is connected by a wire 15 with the contact K² of the switch K, and a wire 16 connects the other contact K³ by way of a binding post 17 with the contact T² normally connected by the contact T' with the contact T³. The contact T³ is connected by a wire 18 with the switch Q' connected with the switch Q at the time the armature lever O² is in the position shown in Fig. 7, and the said switch Q is connected by a wire 19 with the end of the electromagnet J² opposite the one connected with the wires 1 and 10.

The electric circuit for the emergency switch L is arranged as follows: The contact L⁶ is connected by a wire 20 and a binding post 21 with the contact S² normally connected by the contact plate S with the contact S³. The contact S³ is connected by a wire 22 with the wire 19 and hence with the electro-magnet J². The contact L⁷ is connected by a wire 23 with the wire 15 previously mentioned.

The ignition circuit for the igniting device of the motor is arranged as follows: The positive wire 24 of the ignition circuit is connected with a binding post 25 arranged on the bracket E², and the wire 24 leads from the binding post 25 to both contacts U³ and U⁵, of which the contact U³ is at all times in engagement with the contact U⁴ as previously mentioned, and this contact U⁴ is connected by a wire 26 with the switch R³ connected with the contact R² at the time the switch lever O² is in the position shown in Fig. 6. The switch R² is connected by a wire 27 with the contact S⁵ normally connected by the contact plate S' with the contact S⁶, and this contact plate S⁶ is connected with the negative wire 28 of the ignition circuit by way of the binding post 29. The switch R² is also connected by a wire 30 with the switch R and the latter is connected with the switch R' at the time the armature lever O² is in the position shown in Fig. 7 and the switch R is connected by a wire 31 with the contact U⁶ normally connected by the contact U² with the contact U⁵ connected with the wire 24 as previously explained. The several binding posts 2, 4, 5, 6, 8, 14, 25, 29, 17 and 21 are mounted on the bracket E², as plainly shown in Fig. 4.

The operation is as follows: When the rim N is in uppermost position the electro-magnet O is energized so that the armature lever O² moves into the position shown in Fig. 7, it being understood that when the rim N is in the uppermost position the contact plate N⁵ is in engagement with the contacts N⁶ and N⁷. The circuit for the electro-magnet O is now closed by way of wire 3, binding posts 6, 5, 4, battery J⁴ and wires 1 and 10, electro-magnet O, wire 9, movable contacts P³, P², wire 7 and binding post 8 to contact N⁷. Now when the push button K is pressed by a passenger on the rear seat A' and the contacts K², K³ are connected with each other, then the circuit is closed and the electro-magnet J² is energized to attract the armature J with a view to release the rod D³, as previously explained, so that the brake is applied. It is understood that when the circuit for the switch K is closed the battery J⁴ is connected by way of the wire 3, binding posts 4 and 5, wire 15 to contact K² connected by the member K' with the contact K³ connected by wire 16 and binding post 17 with the contact T² connected by contact T' with the contact T³ connected by wire 18 with switch Q' connected with switch Q by way of the armature lever O² and connected by wire 19 with one end of the electro-magnet J² connected at its other end by the wire 1 and binding post 2 to the battery J⁴ to complete the circuit. When the chauffeur depresses the rim N then the plate N⁵ makes contact with the contacts N⁶ and N⁸, and when this takes place the circuit for the switch K is broken at the electro-magnet O′ as the latter is now energized and the armature lever O² swings into the position shown in Fig. 6. It is understood that when this takes place the wires 18 and 19 are disconnected at the switches Q, Q′, the current now flowing from the battery J⁴ by way of the wire 3 to contacts N⁶, N⁵ and N⁸, wire 18 to movable contacts P, P′, wire 12 to the electro-magnet O′ connected by wires 11, 10, 1 and binding post 2 with the battery J⁴. It is understood that when the armature lever O² swings into the position shown in Fig. 6, the circuit at the movable contacts P, P′ is broken. The ignition circuit is now closed by way of the wires 24, contacts U³, U′, U⁴, wire 26, switches R³, R², wire 27, contacts S⁵, S′ and S⁶ to wire 28. In case of an emergency a passenger in the rear seat on breaking the glass front L² causes the application of the brakes by way of the auxiliary actuating device even if the rim N is pressed to its seat by the chauffeur. When the glass front L² is broken the contact L⁴ moves into engagement with the contacts L⁵, L⁶ to close the emergency circuit and thereby energize the electro-magnet J². It will be noticed that in this case the current flows from the battery J⁴ by way of the wire 3, binding posts 4, 5, wires 17, 22, contacts L⁴, L⁵, L⁶, wire 20, contacts S³, S, S², wires 22 and 19 to one end of the electro-magnet J² connected at its other end by the wire 1 and binding post 2 with the battery J⁴. It is understood that when the rod D³ is moved rearwardly for applying the brakes as previously mentioned, the battery circuits are broken by the plates S, S′ at the contacts S³, S⁵, and S⁵, S⁶ so that the battery is not run down after the brake is applied. It will also be noticed that when the rod D³ is released and moves rearwardly and a swinging motion in a rearward direction is given to the arm D then the rod T is moved rearwardly whereby the contact T′ is moved out of engagement with the contacts T², T³ to cut out the battery and the switch K. This action also takes place whenever the brake mechanism is applied by hand or by foot. Presuming that the lever V² has been actuated by the chauffeur to throw the speed gear into motion, and the rim N has been depressed, then the circuit is broken by the contact U² moving out of engagement with the contacts U⁵, U⁶ owing to the fact that the rod U has been moved rearwardly by the chauffeur imparting a rearward swinging motion to the lever V². The ignition current now flows by way of wire 24, contacts U³, U′, U⁴, wire 26, switches R³, R², wire 27, contacts S⁵, S′ and S⁶ to wire 28 so that no interference whatever is had with the proper running of the car as long as the chauffeur keeps his hands on the steering wheel B and depresses the rim N. Assuming now that the rim N is released while the lever V² is left in active position as described, then the ignition circuit will be broken at the switches R³, R² so that the ignition ceases and the car comes automatically to a stop. Presuming that the car is to be brought to a standstill and the motor left running, the lever V² has to be moved to inner position so that the contact U² moves into engagement with the contacts U⁵, U⁶ and the switches R and R′ are connected with each other owing to the released position of the rim N.

From the foregoing it will be seen that under no circumstances can the chauffeur let go of the steering wheel B with the car running and the motor connected without said car coming to a stop, in other words, the chauffeur must move the lever V² to neutral position before he can release the steering-wheel B and the rim N.

In order to reset the auxiliary actuating device after the brake has been applied as above explained, it is only necessary for the chauffeur to swing the emergency lever C forwardly so that the rod D³ is moved in a like direction to compress the spring G³ and to cause the arm H to reëngage the rear end of the block D⁴ with a view to lock the bar D³ in normal locked position.

The auxiliary actuating device may be used for applying the brake automatically in case the automobile is running and the chauffeur releases the rim N. In this case the switches K and L and their circuits may be dispensed with together with the circuit breakers or switches Q, Q′, R, R′ at the electro-magnets O and O′. The arrangement is shown in Fig. 17. Assuming that the rim N is in raised position and the change speed gear lever V² and the rod U are in neutral position, then the electro-magnet O′ is energized to hold the armature lever O² in the position shown in Fig. 6. The circuit is by way of the contacts N⁵, N⁶, wire 3, battery J⁴, wires 1, 10, 11, electro-magnet O′, wire 12, sliding contacts P′, P and wire 7 to the contact N⁷. The circuit for the electro-magnet J² is broken at the fixed contact U⁹ now out of engagement with either of the contacts U¹⁰, U¹¹ and U⁷, U⁸ attached to the rod U and moving with the same. Assuming now that the rim N is pressed downward into the seat B² then the contact N⁵ moves out of engagement with the contact N⁶ and moves into engagement with the contact N⁸ so that the circuit for the electro-magnet O is closed by way of the contact N³, wire 13, switches R², R³, wire 9, electro-magnet O, wires 10 and 1 to battery J⁴ and by wire 3 to contact N⁶. It is understood that when the electro-magnet O is thus energized the armature lever O² swings into the position shown in Fig. 7. The circuit of the electro-magnet J² is now still further broken at the switches R², R³ owing to the change of the position of the armature lever O². When the chauffeur now actuates the lever V² in either direction and throws the gearing in mesh for high, low or reverse speed and starts the car then the auxiliary actuating device is not applied as long as the rim N is kept in the pressed position although either of the contacts U¹⁰, U¹¹ or U⁷, U⁸ of the shifted rod U have moved into engagement with the fixed contacts U⁹. In case the rim N is now released by the chauffeur while the automobile is running then the auxiliary actuating device is released to apply the brake with a view to bring the automobile to a standstill. It is understood that when the rim N is released the circuit for the electro-magnet J² is closed by way of wires 3, 40, contacts U¹⁰, U⁹, U¹¹, or U⁷, U⁹, U⁸, wire 41, contact T², T⁷, T³ and wire 42 to sliding contacts P³, P² and wire 19 to electro-magnet J² and wire 1 to battery J¹. The electro-magnet J² is now energized to cause applying of the brake as above mentioned. It will be noticed that in case the chauffeur releases the depressed rim N while the car is in motion, the auxiliary actuating device is released and the brake is applied so that the automobile will be brought to a standstill.

For electric power-driven vehicles, the ignition circuit is connected with the release rod D³ (see Fig. 18) and the source of electrical energy of the motor is also used for the circuits of the actuating device instead of battery J⁴.

Having thus described my invention, I claim as new and desire to secure by Letters Patent:

1. In an automobile, the combination of the usual brake mechanism, the usual steering mechanism, a spring-pressed actuating device connected with the said brake mechanism, a locking mechanism for normally locking the said actuating device while the latter is under the tension of its spring, and an electrically-controlled releasing device for the said braking device.

2. In an automobile, the combination of the usual brake mechanism, the usual steering mechanism, a spring-pressed actuating device connected with the said brake mechanism, a locking mechanism for normally locking the said actuating device while the latter is under the tension of its spring, an electrically-controlled releasing device for the said locking device, and including an electric passenger switch under the control of a passenger in a rear seat of the automobile, and an electric-controlling switch under the control of the chauffeur for rendering the said passenger switch ineffective.

3. In an automobile, the combination of the usual brake mechanism, the usual steering mechanism, a spring-pressed actuating device connected with the said brake mechanism, a locking mechanism for normally locking the said actuating device while the latter is under the tension of its spring, and an electrically-controlled releasing device for the said locking device, and including an electric emergency switch under the control of a passenger in a rear seat of the automobile to actuate the said releasing device.

4. In an automobile, the combination of the usual brake mechanism, the usual steering mechanism, a spring-pressed rod connected with the said brake mechanism, a locking device for locking the said rod against movement while under the tension of its spring, an electric releasing device including an electro-magnet having an armature for unlocking the said locking device, an electric switch under the control of a passenger, and an electric switch under the control of the chauffeur and associated with the said steering mechanism to be actuated when the chauffeur takes hold of or releases the steering wheel of the steering mechanism.

5. In an automobile, the combination of the usual brake mechanism, the usual steering mechanism, an auxiliary actuating device connected with the said brake mechanism, a locking device for the said actuating device, and an electrically-controlled releasing device for the said actuating device, the said releasing device having two switches, of which one is under control of a passenger and the other is under the control of the chauffeur and is associated with the steering mechanism to render the passenger switch ineffective as long as the chauffeur has control of the steering mechanism.

6. An auxiliary actuating device for the brake mechanism of an automobile, comprising a spring-pressed rod connected with the brake mechanism, a locking lever engaging the said rod to hold the same normally in locked position while under the tension of its spring, a releasing lever engaging the said locking lever, an electro-magnet having an armature normally holding the said releasing lever in more or less active position, an electric circuit for the said electro-magnet, a passenger switch in the said circuit, a controlling switch in the said circuit and under the control of the chauffeur, and an electric cut-out device for the said passenger switch and controlled by the said controlling switch.

7. An auxiliary actuating device for the brake mechanism of an automobile, comprising a spring-pressed rod connected with the brake mechanism, a locking lever engaging the said rod to hold the same normally in locked position while under the tension of its spring, a releasing lever engaging the said locking lever, an electro-magnet having an armature normally holding the said releasing lever in more or less active position, an electric circuit for the said electro-magnet, a passenger switch in the said circuit, a controlling switch in the said circuit and under the control of the chauffeur, and an electric cut-out device for the said passenger switch and controlled by the said controlling switch, and an emergency switch in the said circuit and under the control of a passenger to energize the said electro-magnet independently of the said controlling switch.

8. An auxiliary actuating device for the brake mechanism of an automobile, comprising a spring-pressed rod connected with the brake mechanism, a locking lever engaging the said rod to hold the same normally in locked position while under the tension of its spring, a releasing lever engaging the said locking lever, an electro-magnet having an armature normally holding the said releasing lever in more or less active position, an electric circuit for the said electro-magnet, a passenger switch in the said circuit, a controlling switch in the said circuit and under the control of the chauffeur, an electric cut-out device for the said passenger switch and controlled by the said controlling switch, and a circuit breaker in the said circuit and having fixed contacts and movable contacts held on the said rod to break the circuit on the release of the rod.

9. An auxiliary actuating device for the brake mechanism of an automobile, comprising a spring-pressed rod connected with the brake mechanism, a locking lever engaging the said rod to hold the same normally in locked position while under the tension of its spring, a releasing lever engaging the said locking lever, an electro-magnet having an armature normally holding the said releasing lever in more or less active position, an electric circuit for the said electro-magnet, a passenger switch in the said circuit, a controlling switch in the said circuit and under the control of the chauffeur, an electric cut-out device for the said passenger switch and controlled by the said controlling switch, and a circuit breaker in the said circuit and connected with the brake mechanism to break the circuit after the rod is released.

10. An auxiliary actuating device for the brake mechanism of an automobile, comprising a spring-pressed rod connected with the brake mechanism, a locking device for locking the said rod against movement while under the tension of its spring, a releasing lever for the said locking device to normally hold the locking device in locking position, a main electro-magnet having an armature engaging the said releasing lever to hold the latter normally against movement, an electric circuit for the said main electro-magnet and connected with a source of electrical energy, a passenger switch, a spring-pressed rim movable on the steering wheel of the automobile and provided with a switch, a pair of electro-magnets having a rocking armature lever, an electric circuit connected with the said rim switch and the said pair of electro-magnets, and an electric circuit for the said passenger switch and connected with the said pair of electro-magnets.

11. An auxiliary actuating device for the brake mechanism of an automobile, comprising a spring-pressed rod connected with the brake mechanism, a locking device for locking the said rod against movement while under the tension of its spring, a releasing lever for the said locking device to normally hold the locking device in locking position, a main electro-magnet having an armature engaging the said releasing lever to hold the latter normally against movement, an electric circuit for the said main electro-magnet and connected with a source of electrical energy, an emergency switch, and an electric circuit controlled by the said emergency switch and connected with the said electro-magnet circuit.

12. An auxiliary actuating device for the brake mechanism of an automobile, comprising a spring-pressed rod having a slotted end, an arm held on the emergency brake shaft and provided with a pin engaging the said slotted end, a locking lever engaging the said rod to hold the latter normally in locked position while under the tension of the spring, a releasing lever having a pivotal connection with the said locking lever, an electro-magnet having an armature lever engaging the said releasing lever to hold the latter normally in non-released position, an electric circuit for the said electro-magnets, and a switch to close the said circuit.

13. An auxiliary actuating device for the brake mechanism of an automobile, comprising a spring-pressed rod having a slotted end, an arm held on the emergency brake shaft and provided with a pin engaging the said slotted end, a locking lever engaging the said rod to hold the latter normally in locked position while under the tension of its spring, a releasing lever having a pivotal connection with the said locking lever, an electro-magnet having an armature lever engaging the said releasing lever to hold the latter normally in non-released position, an electric circuit for the said electro-magnets, a switch to close the said circuit, and means to break the said circuit after the rod is unlocked.

14. In an automobile, the combination of the usual brake mechanism, the usual steering mechanism having a controlling rim, a speed gear controlling device, a spring-pressed actuating device connected with the said brake mechanism, a locking mechanism for normally holding the said actuating device in locked position while under the tension of its spring, and releasing means controlled by the said speed gear controlling device for releasing the said locking device on the chauffeur releasing the said controlling rim.

15. In an automobile, a normally locked actuating device for the brake of the automobile, a controlling rim on the steering wheel of the automobile, a releasing device for the said actuating device and connected with the said rim and with the speed gear changing mechanism of the automobile so that when the said speed gear changing mechanism is in active position and the said rim is released the releasing device releases the said actuating device for the latter to apply the brake.

16. An auxiliary actuating device for the brake mechanism of an automobile provided with a spring-pressed rim movably mounted on the rim of the steering wheel, electric circuits having three spaced contacts at the steering wheel and a contact plate on the said rim to connect one of the said contacts with either of the other two contacts on pressing or releasing the said rim.

17. An auxiliary actuating device for the brake mechanism of an automobile provided with a steering wheel having an annular seat in the top of its rim, a controlling rim adapted to be seated in the said seat, and a spring for normally holding the controlling rim off its seat.

18. An auxiliary actuating device for the brake mechanism of an automobile provided with a steering wheel having an annular seat in the top of its rim, a controlling rim adapted to be seated in the said seat and provided with spokes and a hub mounted to slide on the steering wheel shaft, and a spring pressing the said hub to normally hold the controlling rim off its seat.

19. An auxiliary actuating device for the brake mechanism of an automobile provided with a steering wheel having an annular seat in the top of its rim, a controlling rim adapted to be seated in the said seat and provided with spokes, a hub mounted to slide on the steering wheel shaft, a spring pressing the said hub to normally hold the controlling rim off its seat, a contact plate held insulated on the said hub, and a series of spaced insulated contacts of which one is at all times in engagement with the said contact plate and the latter is adapted to move into engagement with the other contacts on pressing and releasing the said controlling rim.

20. An auxiliary actuating device for automobiles, comprising a brake applying device, a locking device for normally holding the said brake applying device in inactive position, a releasing device for the said locking device and including an electro-magnet, an electric cut-out device, a switch at the steering wheel of the automobile, a passenger switch, and electric circuits connected with the said electro-magnet, the said cut-out device and the said switches.

21. An auxiliary actuating device for automobiles, comprising a brake applying device, a locking device for normally holding the said brake applying device in inactive position, a releasing device for the said locking device and including an electro-magnet, an electric cut-out device, a switch at the steering wheel of the automobile, a passenger switch, a passenger emergency switch, and electric circuits connected with the said electro-magnet, the said cut-out device and the said switches.

22. An auxiliary actuating device for automobiles, comprising a brake applying device, a locking device for normally holding the said brake applying device in inactive position, a releasing device for the said locking device and including an electro-magnet, an electric cut-out device, a switch at the steering wheel of the automobile, a passenger switch, a speed gear switch, and electric circuits connected with the said electro-magnet, the said cut-out device and the said switches.

23. An auxiliary actuating device for automobiles comprising a brake applying device, a locking device for normally holding the said brake applying device in inactive position, a releasing device for the said locking device and including an electro-magnet, an electric cut-out device, a switch at the steering wheel of the automobile, a passenger switch, electric circuits connected with the said electro-magnet, the said cut-out device and the said switches, and circuit breakers to break the circuit after the brake-applying device has moved into brake-applying position.

In testimony whereof I have signed my name to this specification in the presence of two subscribing witnesses.

EDWARD A. DIETERICH.

Witnesses:
 THEO. G. HOSTER,
 GEO. H. EMSLIE.